United States Patent
Mancini, Jr.

[11] Patent Number: 5,842,540
[45] Date of Patent: Dec. 1, 1998

[54] ROTARY TREE CLIMBING STAND

[76] Inventor: Julius P. Mancini, Jr., 1659 Pear La., Greenville, Miss. 38703

[21] Appl. No.: 69,739
[22] Filed: Apr. 30, 1998

Related U.S. Application Data

[60] Provisional application No. 60/045,700 May 6, 1997.
[51] Int. Cl.$^6$ ......................................................... A45F 3/26
[52] U.S. Cl. ............................................ 182/136; 182/187
[58] Field of Search .................................... 182/135, 136, 182/187, 188

[56] References Cited

U.S. PATENT DOCUMENTS

| | | |
|---|---|---|
| 4,069,891 | 1/1978 | McClung . |
| 4,150,733 | 4/1979 | Plummer . |
| 4,730,699 | 3/1988 | Threlkeld . |
| 4,784,239 | 11/1988 | Kirkman . |
| 5,052,516 | 10/1991 | Jamieson . |
| 5,275,257 | 1/1994 | Robertson . |
| 5,348,119 | 9/1994 | Filkins . |

FOREIGN PATENT DOCUMENTS

| | | |
|---|---|---|
| 901972 | 5/1953 | Germany . |
| 252307 | 7/1929 | Italy . |

*Primary Examiner*—Alvin C. Chin-Shue
*Attorney, Agent, or Firm*—Richard C. Littman

[57] ABSTRACT

A rotatable tree stand that allows a hunter or wildlife photographer to comfortably and safely shoot or photograph approaching wildlife. The tree stand has two primary components. The first is an upper support which contains the seat structure and an assembly for attaching the seat structure to the tree, comprised of an upper brace and lower brace. The second is a lower support which contains a platform and an assembly for attaching the platform to the tree. The supports engage opposite sides of a tree trunk in offset transverse planes of the trunk, thereby allowing a cantilevering action when the seat structure is occupied allowing the downward force of gravity to act through the braces and in opposing directions against the tree trunk, thereby firmly gripping the tree. The platform is positioned directly below the seat structure, such that, when the user is situated within the seat structure, his feet can rest comfortably on the platform. A tubular frame is attached at its outer side to both the upper and lower brace and is attached, via rollers, on its inner side to a rotatory track. The rollers are disposed within the rotatory track and are attached to the tubular frame. Attached to the inner side of the rotatory track is a seat. The roller and rotatory track assembly allow the user to rotate the seat assembly 360 degrees, allowing the user to face approaching game regardless of the direction.

13 Claims, 6 Drawing Sheets

ROTARY TREE CLIMBING STAND

CROSS-REFERENCE TO RELATED APPLICATION

This application claims the benefit of U.S. Provisional patent application Ser. No. 60/045,700, filed May 6, 1997.

BACKGROUND OF THE INVENTION

1. Field of the Invention

The present invention relates generally to tree stands. More specifically, the invention relates to a portable tree stand with a rotating seat.

2. Description of Related Art

Hunters and wildlife enthusiasts have for years used tree stands to obtain the best shooting angle or capture the perfect picture. The tree stands allow them to place themselves in locations where wildlife may frequent without being observed. The elevated stands also give them a bird's eye view of approaching game.

There is a downside to using the stands, however. First, most tree stands are difficult to install on the tree. Once installed, the stand is immovable; therefore, when game or wildlife approach from a direction not anticipated by the hunter, the hunter must turn or twist his body in the direction of the approaching wildlife. The hunter is then in danger of either falling out of the stand or getting a bad shot at the game. The first possibility places the hunter at risk of bodily harm, whereas the second possibility places the game or wildlife at risk of being wounded and suffering unnecessarily. None of the existing conventional tree stands couple rotation with structural features preventing the user from falling. There is, therefore, a need for a rotating tree stand having a structure which secures the hunter or wildlife photographer to the seat, such that when the user rotates towards approaching game he is secured from falling therefrom. The present invention provides such a device, which is also easily and quickly installed onto and raised up a tree.

One example of a prior rotating tree stand is U.S. Pat. No. 4,069,891, issued to Thomas Arthur McClung, describing a rotating stand which completely encloses the user. This stand is too bulky to be easily portable or easily installed in a tree, and makes no provision to assist the user in climbing the tree.

Past inventors have designed other, more portable rotating tree stands. U.S. Pat. No. 4,150.733, issued to Mace E. Plummer, describes a flat, rotating seat attached to a support frame. U.S. Pat. No. 4,730,699, issued to Robert G. Threlkeld, describes a platform having a rotating, barstool-type seat attached to a support frame. Additionally, U.S. Pat. No. 5,348,119, issued to James S. Filkins, describes a seat slidably mounted on a track which encircles a tree. None if the above inventions makes any provision to prevent the user from falling, or to assist the user in climbing the tree.

Some prior inventions incorporate a ladder to assist in climbing the tree. One example is U.S. Pat. No. 4,784,239, issued to Obie L. Kirkman, describing a rotating, barstool-type seat attached to an open base frame. The drawings appear to show a ladder as part of the stand, but nothing about the ladder is mentioned in the text. Additionally, U.S. Pat. No. 5,275,257, issued to H, Eugene Robertson, discloses a rotating, barstool-type seat attached to a platform, which is in turn attached to the tree. The invention includes a telescoping ladder. Both inventions claim to be lightweight to facilitate transportation and installation. Both inventions, however, require climbing the tree to secure the stand to the tree, whereas the present invention is totally secured to the tree throughout the climbing process.

U.S. Pat. No. 5,052,516, issued to Thomas C. Jamieson, describes a tree stand which assists the user in climbing the tree. The stand comprises a seat and a foot platform, each having an upper support with a blade on the far side of the tree, and a lower support resting against the near side of the tree, so that the weight of the user pulls the supports against the tree. The user can climb the tree by alternately raising the upper and lower portions. This stand lacks any means of rotating the seat.

Foreign patents for tree stands include Italian Pat. No. 252,307, and German Pat. No. 901,972.

None of the above mentioned patents describes a tree stand which is portable, which assists the user in climbing the tree, which rotates to provide a 360° view, and which has a structure surrounding the hunter to prevent falls.

None of the above inventions and patents, taken either singly or in combination, is seen to describe the instant invention as claimed.

SUMMARY OF THE INVENTION

The invention relates to a rotatable tree stand that allows a hunter or wildlife photographer to comfortably and safely shoot or photograph approaching wildlife. The tree stand has two separate components which act together to form the stand when installed around the trunk of a tree. The two components allow the tree stand to be shimmied up the trunk of a tree by alternatingly bringing up the upper component and then the lower component to a temporarily secured position.

The first component or upper support includes a seat structure attached to a frame for attaching the seat structure to a tree trunk by a mechanical force advantage only. The attachment frame comprises a pair of horizontal upper braces and a pair of lower braces offset at an acute downward angle from the upper braces, each pair of braces spanned at one end by an adjustable blade. The blades engage opposite sides of a tree trunk in offset transverse planes of the trunk, so that the cantilevering action caused by the weight of the stand's occupant levers the braces against the tree trunk in opposing directions, thereby firmly gripping the tree.

The seat structure includes a circular, tubular frame attached to the other end of the pair of upper brace and lower braces and provides support for rotating elements of the seat structure. A rotatory track is provided around the inside of the circular, tubular frame, riding on rollers which are attached to the tubular frame and oriented radially towards its center. Attached to the rotatory track, via chains having a plastic tubular covering, is a seat. The roller and track assembly allow the user to rotate the chair 360 degrees, allowing the user to face approaching game regardless of the direction. The seat also includes a safety crotch strap extending from the front of the seat to the front of the rotatory track.

The second component or lower support includes a platform and an identical attachment frame for removably attaching the platform to the tree, also comprising an upper brace and lower brace as previously described. A pair of foot straps are provided on the top surface of the platform for insertion of both feet.

A hunter or photographer may use the upper and lower portions of the stand to assist in climbing the tree. First, the braces of each portion are positioned around the tree, with the lower portion near the ground, and the upper portion above it, close enough to the ground to allow the user to easily climb into the stand. The user then inserts his feet in the lower portion's straps, grabs the upper portion and lifts the upper portion as high as he can. The lifting action reverses the cantilever force on the upper portion, releasing it from the tree. After raising the upper portion, the user pushes down on it to firmly seat it against the tree. The user then raises the lower portion in the same manner using his legs. By alternately raising the upper and lower portions, the user can easily raise both himself and the stand to the desired height, while remaining safely secured to the tree at all times.

After reaching the desired height in the tree, the platform is positioned directly below the seat structure, such that when the user is situated within the seat structure, the user's feet can rest comfortably on the platform or be used to force rotation of the seat structure by pressing against the stationary platform.

The combination of the foot platform, rotatory track, circular frame, seat, and crotch strap prevent the user from falling out of the stand. When seated, the user is surrounded by the circular frame and rotatory track, preventing falls from the seat. The seat and crotch strap prevent the user from sliding forwards out of the stand. When standing on the lower platform, the circular frame and rotatory track will be around the user's thighs, preventing falls. The crotch strap will remain between the user's legs, rotating the seat as the user rotates, so that the seat is always in the proper position when the user sits down.

Accordingly, it is a principal object of the invention to provide a tree stand which is both portable and easy to install on a tree.

It is another object of the invention to provide a tree stand which is rotatable through 360 degrees.

It is a further object of the invention to provide a tree stand having suitable structures to prevent falls.

Still another object of the invention is to provide a tree stand which assists the user in climbing the tree, while remaining firmly secured to the tree throughout the climbing and installation process.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The invention relates to a rotatable tree stand that allows a hunter or wildlife photographer to comfortably and safely shoot or photograph approaching wildlife. An upper support includes a 360° rotatable seat structure dimensioned and configured to safely and comfortably contain the user. Directly below the seat structure is a platform which allows the user to place his feet thereupon when seated in the seat structure.

Figure 1:
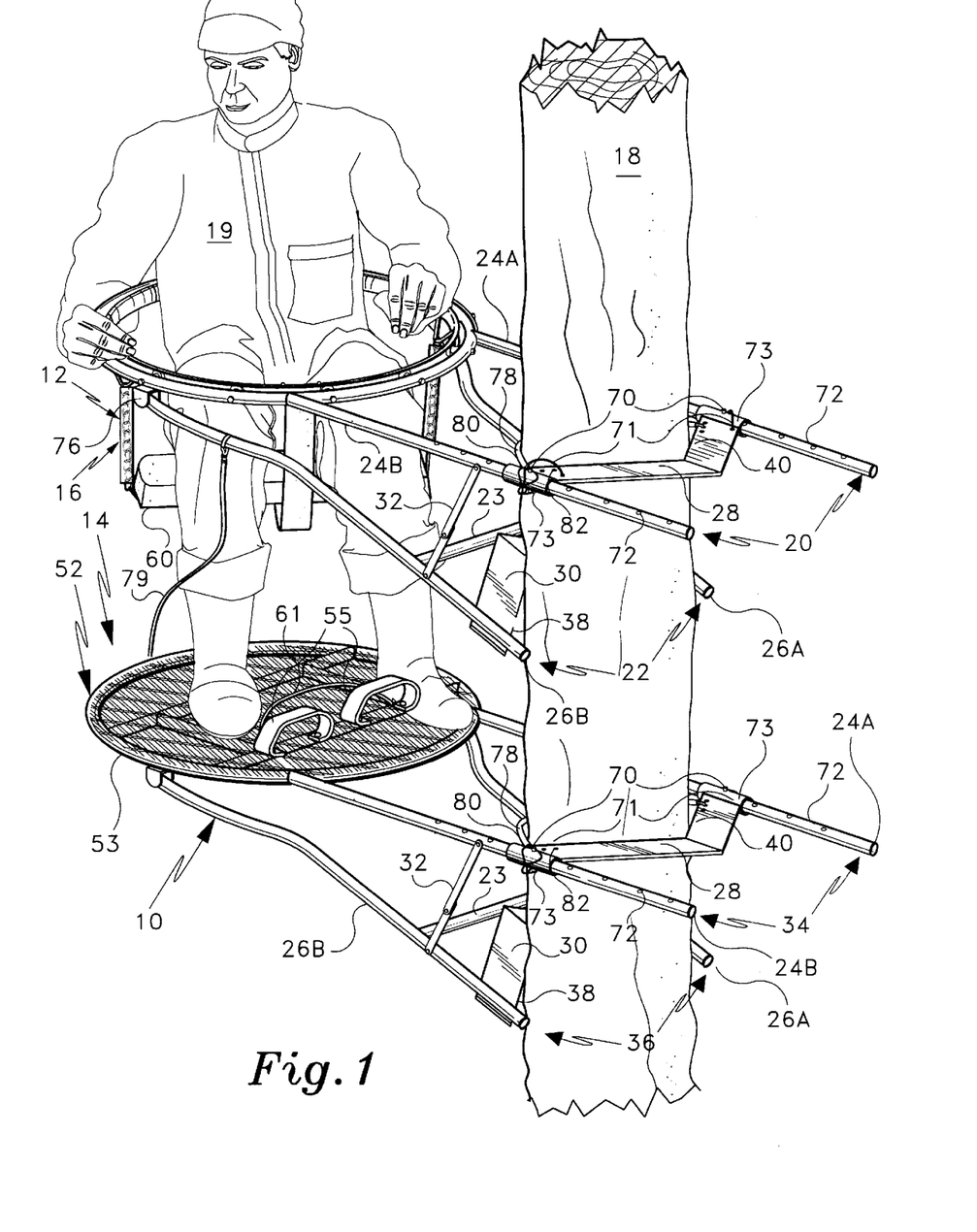
FIG. 1 is an environmental, perspective view of the tree stand.
Figure 2:
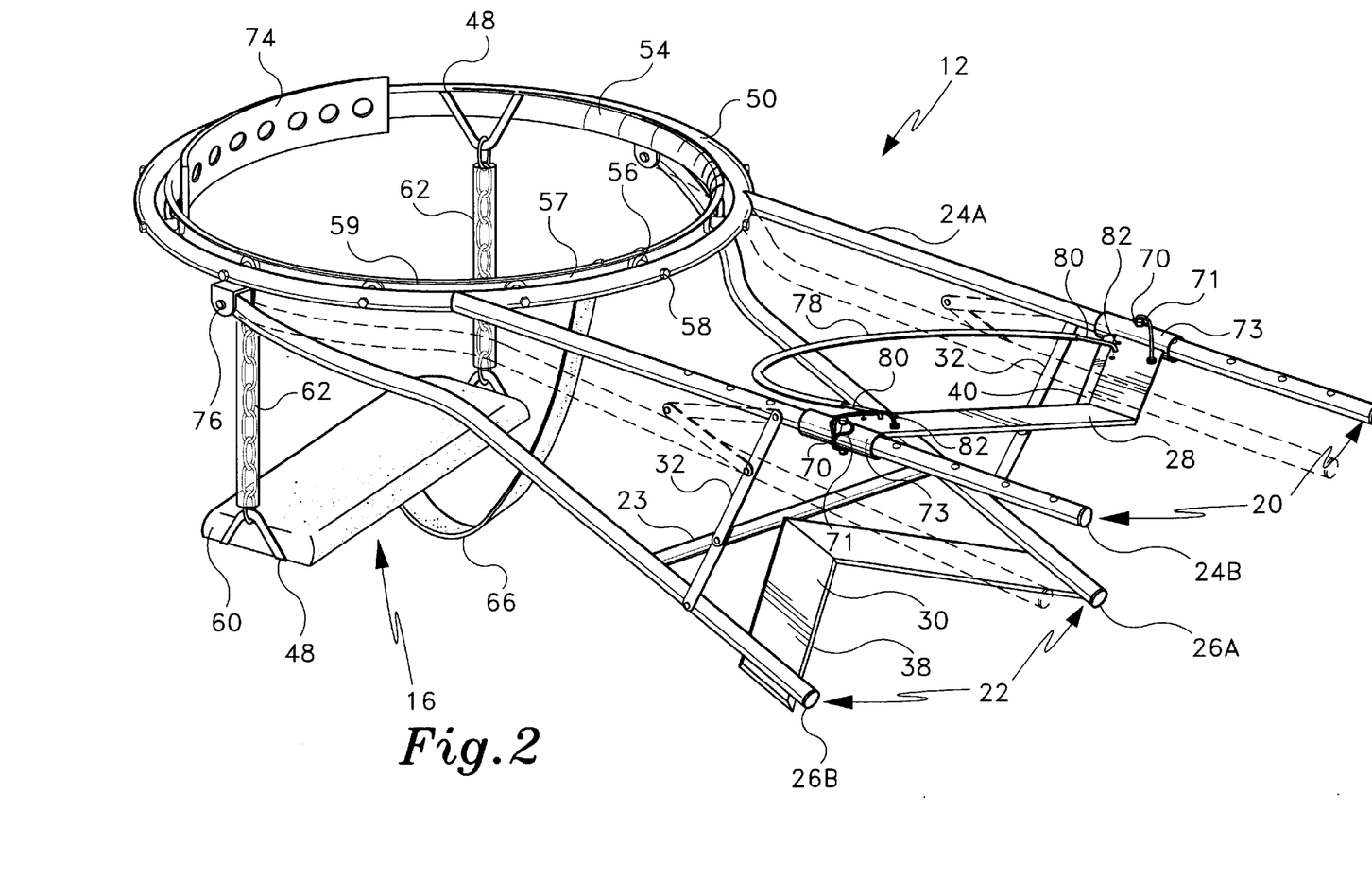
FIG. 2 is a perspective view showing the upper portion of the stand.

Turning now to FIGS. 1 and 2 of the drawings, a tree stand 10 is illustrated affixed to a tree 18 with a hunter or wildlife photographer 19 seated within the seat structure 16. The tree stand is comprised of two main components; an upper support 12 and a lower support 14. The upper support 12 comprises a seat structure 16 and an attachment means for mounting the seat structure 16 to the tree 18. The lower support 14 comprises a platform 52 and a second attachment means for mounting the platform 52 to the tree 18.

Considering each of the attachment means first, both the means for mounting the seat structure 16 and the platform 52 to the tree work on a cantilever principle and are structurally similar. Essentially, the force of gravity acts downward on the seat structure 16 of the upper support 12, or the platform 52 of the lower support, and is then translated by a pair of brace assemblies 20,22 into horizontal forces that act in opposing directions against opposite sides of a tree trunk.

The brace assemblies include an upper brace assembly 20 and a lower brace assembly 22. The individual components of the upper brace assembly 20 include a left arm 24A and a right arm 24B, having a first end attached to the seat structure 16 so that the arms 24A,24B extend generally horizontally therefrom. The lower brace assembly 22 likewise includes a left arm 26A and a right arm 26B, each arm pivotally attached at pivot joint 76 of seat structure 16 to allow a downward acute angle from horizontal relative to upper brace assembly 22 to be maintained. Each of a pair of linkage arms 32,32 are attached to an associated pair of upper and lower arms (24A and 26A, or 24B and 26B), which linkage arms 32,32 provide bilateral straps limiting the maximum angle of declination of lower brace assembly 22. As shown in FIG. 2 in phantom, each of the linkage arms 32,32 may be medially hinged to allow collapse of the lower brace assembly 22 towards upper brace assembly 20 allowing the upper and lower brace assemblies to be brought into nearly coplanar relation, providing for compact storage. Such hinged linkage arms 32 should have locking features for use in a fully extended position.

Figure 3:
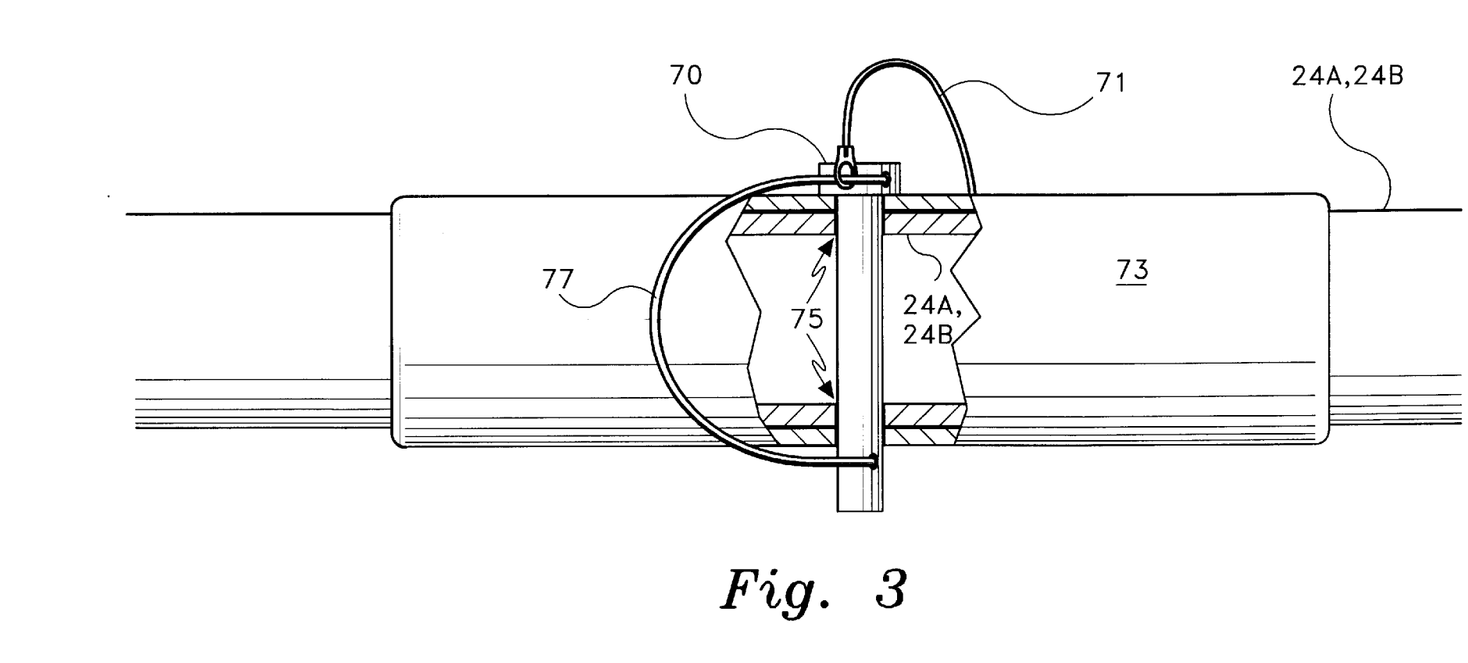
FIG. 3 is a cutaway view of the safety snap pin in use.

Referring back to FIGS. 1 and 2, the arms 24A, 24B, 26A, and 26B are sufficiently spaced apart to allow each arm of a left or right pair to be placed on an opposite side of a large tree trunk 18, as shown in FIG. 1. Referring to FIGS. 1 and 3, an inner blade 30 is attached to and spans from left arm 26A to right arm 26B. Crossbar 23 reinforces inner blade 30. Inner blade 30 braces the lower brace assembly against the tree. The left and right arms 26A,26B of the lower brace assembly 22 are shorter than the left and right arms, 24A, 24B, of the upper brace assembly 20, thereby positioning the inner blade 30 to bridge the tree trunk transversely on the side proximate the seat structure 16. Preferably, inner blade 30 has a chevron-like shape, with the sharpened inner 38 edge facing the seat. The chevron-like shape maximizes the blade surface area in contact with the tree, and centers the tree between the arms, given a tree of any diameter which will fit between the arms.

Similarly, an outer blade 28 is removably attached to the upper brace assembly 20, proximate the second end of each arm 24A,24B. Preferably, the outer blade also has a chevron-like shape, with the sharpened inside edge 40 facing the seat. The outer and inner blades 28,30 may also be bevelled facing the tree trunk to provide a biting edge. After placing the inner blade 30 against the tree trunk, the outer blade 28 is attached on the side of the tree trunk diametrically opposite the inner blade 30, spanning from left arm 24A to right arm 24B and thereby transversely bridging the tree trunk. The blades 28,30 therefore lie in offset planes on opposite sides of the tree trunk, which the allows a downward force on the seat structure 16 to pinch the blades 28,30 against the trunk in a cantilevering action. Conversely, an upward force releases the pinching action.

Referring to FIGS. 1–3, the outer blade 28 may be removably attached by means of a tube 73 concentrically fitted over each of the braces 24A,24B,26A,26B and attached to each terminus of outer blade 28. The tubes 73 permit sliding of the blade 28 along the brace assembly. A plurality of holes 72 is provided serially along the length of each of the braces 24A and each tube 73 is provided with a through hole 75 aligned in registry with each of the holes 72. These provide a means for securing the outer blade 28 along the left and right arms 24A,24B in order to accommodate varying diameter tree trunks and thereby maintain the upper support 12 or lower support 14 in a generally horizontal attitude during cantilevering use.

A safety snap pin 70 secures the tubes 73 in place by passing through one of a plurality of serial holes 72 provided in each of the left and right arms 24A,24B and each tube 73, the holes 72,75 each having been selectively brought into registry with one another. The safety snap pin 70 is preferably attached to the blades 28 or 30 by a lanyard 71, preventing loss. A spring clip 77 is provided to perform the safety function of the snap pin 70, wherein the spring clip 77 secures the pin 70 from dislodging after tube 73 is secured. The preferred embodiment also includes safety strap 78 with hooks 80 on either end, which can be hooked into holes 82 on the upper blade 22 of when the stand is positioned on a tree.

Referring to FIG. 1, lower support 14 is comprised of two basic elements; a platform 52 and means for mounting the platform 52 to the tree 18. Means for mounting platform 52 include an upper brace assembly 34 attached to a lower brace assembly 36, having similarly numbered components as previously described for upper support 12. The upper brace assembly 34 and lower brace assembly 36 and their components are structurally and functionally identical to that of the upper support 12, previously described. The upper surface of platform 52 is also provided with a pair of stirrups 55 and cord 61 for use in raising or lowering the lower support 12 by means of the users feet, as described later.

Upper brace assembly 34 is coplanar with the plane defined by the surface 53 of platform 52. By adjusting outer blade 28 relative to inner blade 30 closely around the tree trunk 18 as previously noted, platform 52 can be adjusted to a generally horizontal, level plane during use for a safe footing while awaiting the arrival of game.

Referring to FIGS. 1 and 2, the seat structure 16 allowing 360° rotation of a user in tree stand 10 is illustrated in FIG. 2 of the drawings. A tubular frame 52 of seat structure 16 is circular in shape and, as noted, is attached to the first end of arms 24A, 24B and arms 26A, 26B. The plane defined by tubular frame 52 is generally coplanar with the plane defined by upper brace assembly 20. Rollers 56 are attached to the inner perimeter of tubular frame 52 via bolts 58 and are oriented towards its center. A circular rotatory track 54 is provided around the inside circumference of the circular, tubular frame 52, and rides on the rollers 56 by means of an enclosing channel 57, defined by flanges 59 of track 54. The rollers 56 freely rotate about bolt 58, which in turn allow rotatory track 54 to freely rotate within the plane defined by tubular frame 52.

Chains having a plastic tubular covering 62 are attached to V-shaped brackets 48, which are in turn attached to rotatory track 54 and depend downward therefrom. Seat 60 is attached to the bottom of chains 62, using another set of V-shaped brackets. Crotch strap 66 is secured to the seat 60 and extends upwardly therefrom and is attached to rotatory track 54. When the user places a rotational force on seat 60, the rotational force is translated to rotatory track 54 which will then rotate via rollers 56 in the direction of the rotational force. The rotatory track permits the seat assembly, comprising the track 54 and its attached seat components 60,62, 48,66,74, to rotate a full 360°.

Backrest 74 is attached directly to rotatory track 54, and therefore also rotates with the track 54. The backrest 74 provides comfort and therefore minimizes fatigue while a user is seated within seat structure 16. Seat 60, crotch strap 66, chains with tubular plastic covering 62, and backrest 74 all are secured directly or indirectly to rotatory track 54 such that by causing rotatory track 54 to rotate, all of the components will rotate with rotatory track 54.

The most preferred embodiment includes a lanyard 79 attaching the seat structure 16 to the platform 52. If the lower support 14 falls from its usual supported position, the lanyard 79 will prevent it from falling out of reach of the hunter.

Figure 4A:
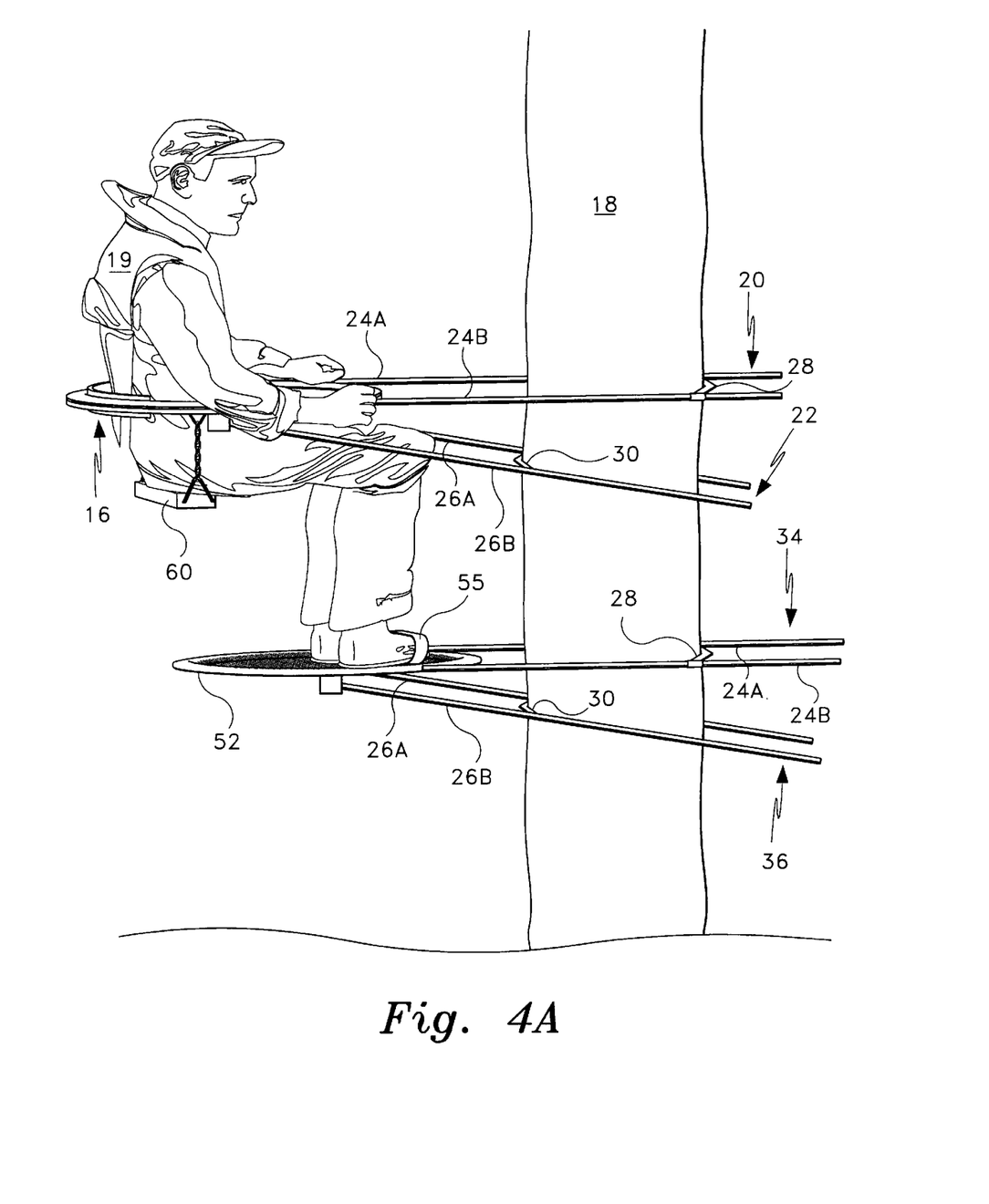
FIG. 4A is a diagrammatic view of the invention during the first step of climbing a tree.
Figure 4B:
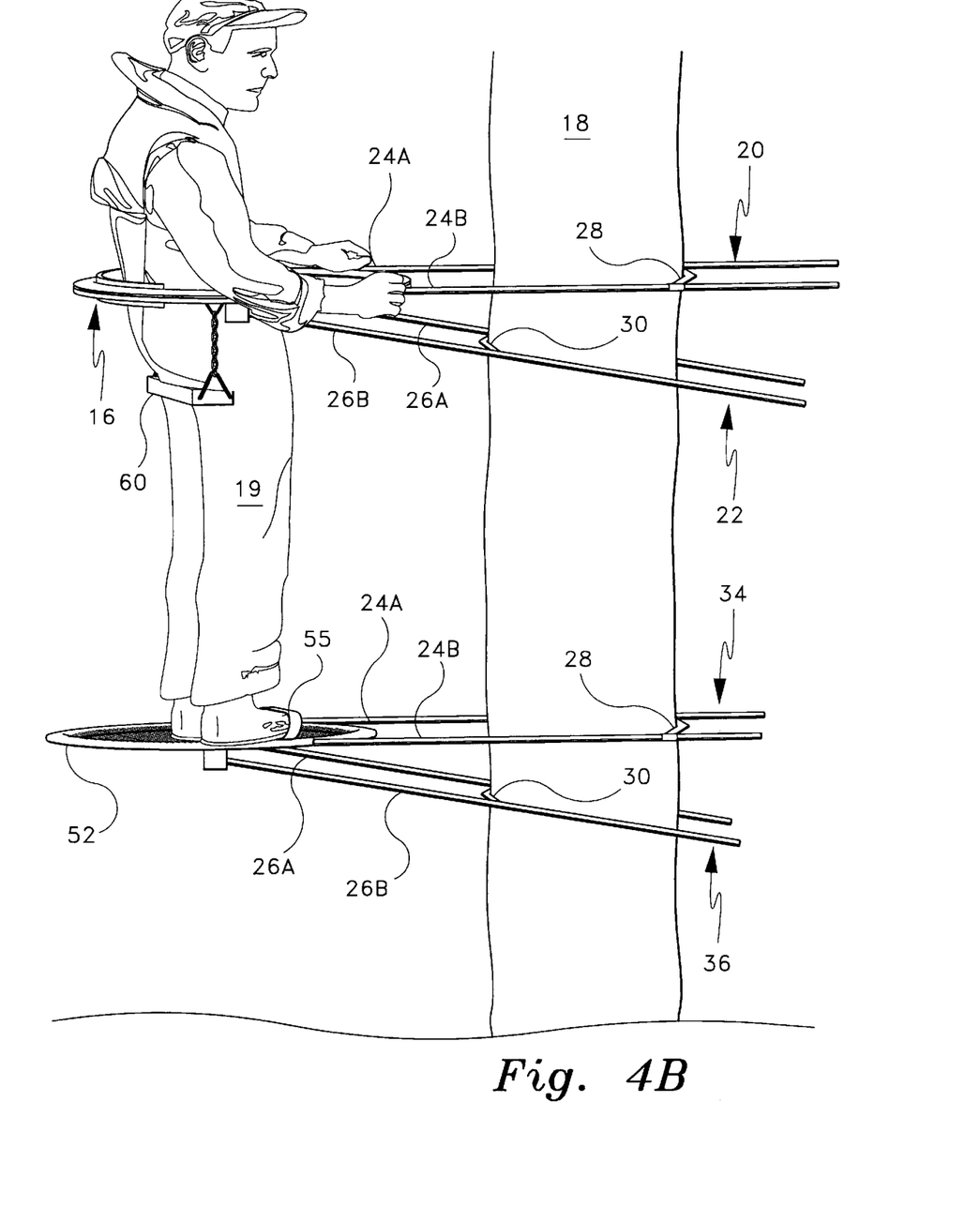
FIG. 4B is a diagrammatic view of the invention during the second and subsequent steps of climbing the tree.
Figure 4C:
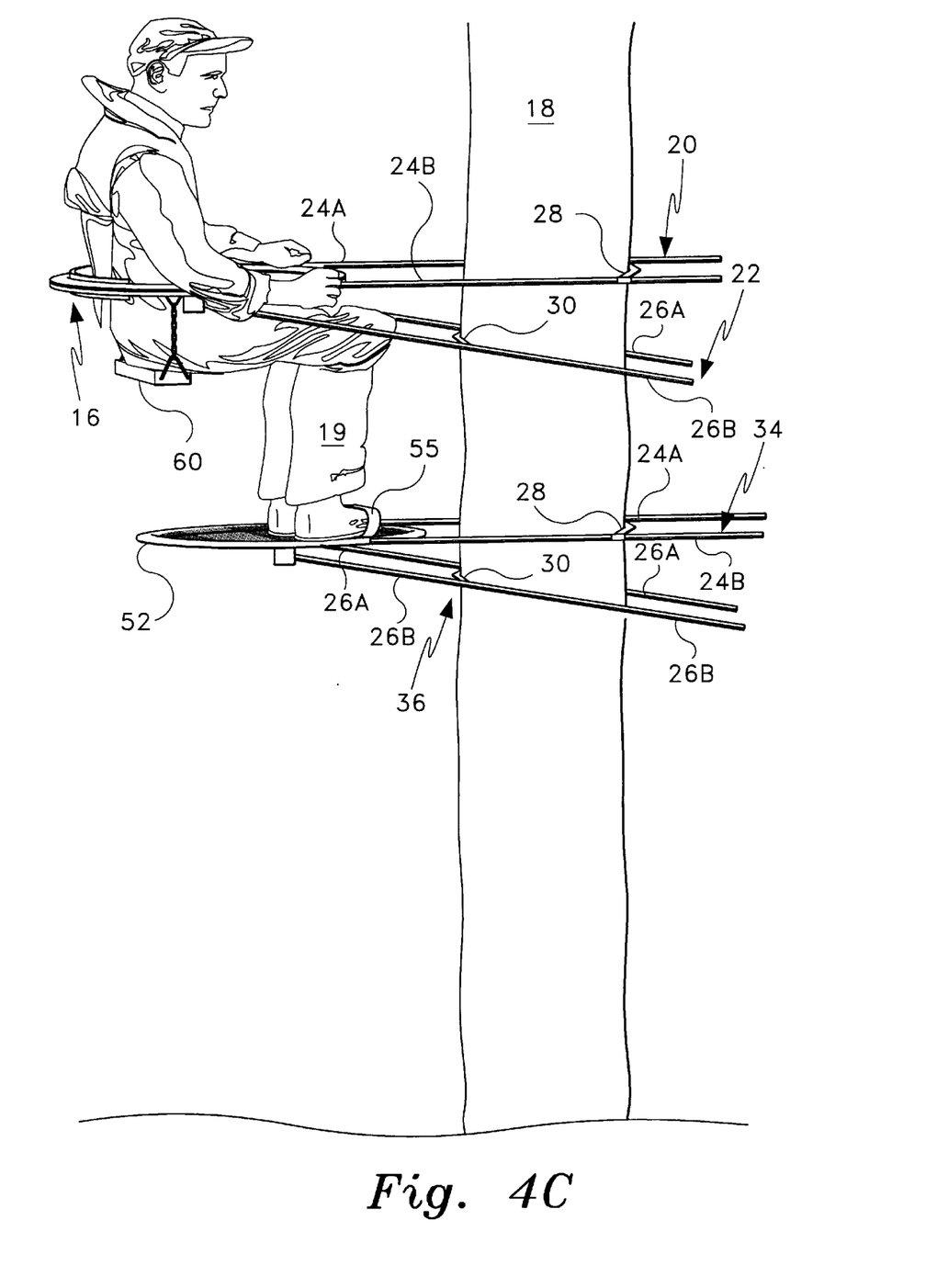
FIG. 4C is a diagrammatic view of the invention during the third and subsequent steps of climbing a tree.

Referring to FIGS. 4A–C of the drawings, the method used to raise the tree stand 10 into the tree 18 is described. The user starts with outer blades 28 of upper support 12 removed from arms 24A, 24B, and rests the inner blade 30 of upper support 12 against the tree trunk. Outer blade 28 is then brought against tree 18 and secured to arms 24A, 24B by means of the safety snap pin 70 which is secured through the nearest aligned holes 72,75. Upper support 12 is then placed at a convenient height to allow climbing into the stand, and cantilevered in a horizontal plane by a downward force on seat structure 16 to securely bite blades 28,30 against the tree trunk. Safety straps 78 are not attached during this climbing stage.

Lower support 14 is likewise secured to tree trunk 18 below the upper support 12 near ground level to allow the user to climb onto and stand on platform 52, before climbing into and being seated on seat structure 16. The user then places each foot into a stirrup 55. The cord 61 binds the heel of a boot and firmly secures each foot into stirrup 55. The user is now in the position shown in FIG. 4A. The user then grasps tubular frame 52 and, by an upward force, releases the bite of blades 28,30 of the upper support 12, and raising the upper support up the tree trunk as far as possible, resecuring the bite at that position, shown in FIG. 4B. The user may then be reseated on seat 60, and, with feet in stirrups 55 and by drawing the knees up, brings the lower support 14 up as far as possible, shown in FIG. 4C. By repeating these steps, the user may continue to raise the tree stand 10 to reach the desired height. Once the desired height is reached, the tree stand may be further anchored in place by hooking a safety strap 78 through a hole in either end of the upper blade 28, with the strap 78 running around the side of the tree opposite the blade, thereby helping to pull the blades against the tree. In order to descend, the user simply reverses the process.

It is to be understood that the present invention is not limited to the embodiments described above, but encompasses any and all embodiments within the scope of the following claims.

I claim:

1. A tree stand, comprising:

an upper support comprising:
- a circular frame having a center;
- a rotatory track inside said circular frame, said rotatory track having a channel;
- a plurality of rollers attached to said circular frame, each roller having an axis oriented towards said center of said circular frame, and each roller engaging said channel in said rotatory track;
- a seat suspended from said rotatory track;
- an upper brace assembly having a pair of substantially parallel braces, each having a first end and a second end, said first end attached to said circular frame, and a blade having a sharp edge facing said circular frame and removably attached proximate said second end; and
- a lower brace assembly located directly below said upper brace assembly, having a pair of substantially parallel braces, each brace having a first end and a second end section, said first end attaching to said circular frame and a blade having a sharp edge facing outward and attached to said second section; and a lower support, comprising;
- a platform having a top surface;
- a pair of foot straps attached to said top surface;
- an upper brace assembly having a pair of substantially parallel braces, each having a first end and a second end, said first end attached to said platform, and a blade having a sharp edge facing said circular frame, and removably attached proximate said second end; and
- a lower brace assembly located directly below said upper brace assembly, having a pair of substantially parallel braces, each brace having a first end and a second end section, said first end attaching to said platform, and a blade having a sharp edge facing outward attached proximate said second section.

2. The tree stand described in claim 1, further comprising a seat back attached to said rotatory track.

3. The tree stand described in claim 1, further comprising a safety crotch strap having a first end and a second end, said first end attaching to said seat, and said second end attaching to said rotatory track.

4. The tree stand described in claim 1:

wherein said lower brace assemblies are pivotally attached to their respective said circular frame and said platform; and further comprising four linkage arms, each linkage arm having ax upper end, a lower end, and a center, said center having a hinge, said upper end connecting to a respective one of said upper braces, and said lower end connecting to a respective corresponding lower brace.

5. The tree stand described in claim 1, wherein said blades are chevron-shaped, having an inside edge, said inside edge being sharp.

6. The tree stand described in claim 1, wherein a removable safety strap dimensionally suited to wrapping partially or totally around a tree trunk attaches at each end to one or more of said blades.

7. The tree stand described in claim 1, wherein a removable lanyard joins said upper support and said lower support.

8. The tree stand described in claim 1, further comprising a backrest attached to said rotatory track.

9. The tree stand described in claim 1, further comprising adjustment means for removably attaching each said blade and slidably adjusting said blade along said brace assembly.

10. The tree stand described in claim 9, wherein said adjustment means comprises a tube attached to said blade, each said tube concentrically positioned about each said brace.

11. The tree stand described in claim 10, wherein each said brace defines a series of holes, and each said tube defines a through hole for receiving a pin, said through hole aligned in registry with each different one of said series of holes, and further comprising a pin for securing two such holes brought into registry with one another.

12. The tree stand described in claim 11, wherein said pin includes a safety spring clip and a loss-preventing lanyard.

13. The tree stand described in claim 1, wherein said blade defines a plurality of holes, and further comprising a safety strap for encircling a tree trunk, said strap having a first end attaching to one of said plurality of said holes of said blade and a second end attaching to a different one of said plurality of holes of said blade.

* * * * *